United States Patent
Elshaik

(10) Patent No.: US 8,699,655 B2
(45) Date of Patent: Apr. 15, 2014

(54) METHOD OF IMPROVING WEAR AND CORROSION RESISTANCE OF ROD CONTROL CLUSTER ASSEMBLIES

(75) Inventor: Nagwa Mahmoud Elshaik, Chapin, SC (US)

(73) Assignee: Westinghouse Electric Company, LLC, Cranberry Township, PA (US)

( * ) Notice: Subject to any disclaimer, the term of this patent is extended or adjusted under 35 U.S.C. 154(b) by 540 days.

(21) Appl. No.: 13/044,690

(22) Filed: Mar. 10, 2011

(65) Prior Publication Data

US 2012/0230459 A1    Sep. 13, 2012

(51) Int. Cl.
| | | |
|---|---|---|
| *G21C 21/16* | (2006.01) | |
| *G21C 7/10* | (2006.01) | |
| *C23C 16/34* | (2006.01) | |
| *C23C 16/50* | (2006.01) | |
| G21C 21/00 | (2006.01) | |
| G21C 7/00 | (2006.01) | |
| C23C 16/00 | (2006.01) | |

(52) U.S. Cl.
USPC ........... 376/305; 376/207; 376/219; 376/220; 376/277; 376/327; 376/409; 376/412; 376/414; 427/457; 427/532; 427/533; 427/535; 427/540; 427/569; 427/578; 427/589; 427/580; 148/95; 148/206; 148/222; 148/238; 422/129; 422/186; 422/186.04; 422/186.05; 422/186.06

(58) Field of Classification Search
USPC ......... 376/277, 305, 409, 412, 414, 207, 219, 376/220, 327; 148/95, 206, 222, 227–239; 204/164, 177–179; 422/129, 186, 422/186.04–186.06; 427/457, 532, 533, 427/535–540, 569, 578, 579, 580
See application file for complete search history.

(56) References Cited

U.S. PATENT DOCUMENTS

| | | | | |
|---|---|---|---|---|
| 4,109,157 A | * | 8/1978 | Tanaka et al. | 422/186.05 |
| 4,179,617 A | * | 12/1979 | Tanaka et al. | 204/177 |
| 4,179,618 A | * | 12/1979 | Tanaka et al. | 422/186.06 |
| 4,194,930 A | * | 3/1980 | Tanaka et al. | 148/222 |
| 4,212,687 A | * | 7/1980 | Tanaka et al. | 148/222 |
| 4,309,227 A | * | 1/1982 | Kajikawa et al. | 148/222 |
| 4,342,918 A | * | 8/1982 | Tanaka et al. | 422/186.04 |
| 4,704,168 A | * | 11/1987 | Salik et al. | 148/222 |
| 4,873,117 A | * | 10/1989 | Hertz et al. | 427/535 |
| 5,240,514 A | * | 8/1993 | Yasuura et al. | 148/222 |
| 5,267,289 A | * | 11/1993 | Bryan | 376/305 |
| 5,274,686 A | * | 12/1993 | Bryan | 376/414 |
| 5,306,531 A | * | 4/1994 | Laurence et al. | 427/569 |

* cited by examiner

*Primary Examiner* — Bernarr Gregory
(74) *Attorney, Agent, or Firm* — Westinghouse Electric Company, LLC

(57) ABSTRACT

The present invention relates to tubular elements, such as fuel assembly tubes, which are designed to be used in high pressure and high temperature water in nuclear reactors, such as pressurized water nuclear reactors. In particular, the present invention relates to a method of improving wear resistance and corrosion resistance by depositing a protective coating having a depth of from about 5 to about 25 μm on the surface of the tubular elements. The coating is provided by nitriding the tubular element at a temperature of from about 400° C. to about 440° C. The nitridation of the tubular element can be carried out for a duration of from about 12 hours to about 40 hours.

18 Claims, 3 Drawing Sheets

Prior Art

Prior Art

Prior Art

METHOD OF IMPROVING WEAR AND CORROSION RESISTANCE OF ROD CONTROL CLUSTER ASSEMBLIES

BACKGROUND OF THE INVENTION

1. Field of the Invention

The present invention relates to tubular elements, such as control rods and rod control cluster assemblies, for use in high-pressure and high-temperature water of nuclear reactors, such as pressurized water nuclear reactors. In particular, the present invention relates to a system and method for treating these tubular elements to improve their wear resistance and corrosion resistance.

2. Background

In a nuclear power plant, the fuel assemblies of the nuclear reactor core employ rod control cluster assemblies ("RCCAs") to control reactivity. The power produced by the nuclear reactor is generally controlled by raising (e.g., retracting) or lowering (e.g., inserting) the RCCAs within the reactor core. The change in reactor power output required to accommodate a change in the demand for output from the power plant is commonly referred to as load follow.

The RCCAs consist of a plurality of neutron-absorbing control rods fastened at their top ends to a common hub or spider assembly. The body of each of the control rods generally includes a stainless steel tube which encapsulates a neutron-absorbing material. Each of the control rods is slid within a tubular guide thimble tube of the fuel assembly. A control drive mechanism near the top of the spider assembly operates to control the movement of the control rod within the guide thimble tube. In this manner, the controlled insertion and extraction of the control rods generally controls the amount of power produced by the nuclear reactor.

As a result of the operation of the RCCAs in the nuclear reactor, they can be subjected to frictional and vibrational wear. The sliding movement of the control rods being inserted and extracted relative to the guide thimble tubes produces friction. This friction can cause the control rods to wear. Further, the impacting and rubbing of the control rods with the guide thimble tubes as a result of flow induced vibration during reactor operation can also cause the control rods to wear. Furthermore, cooling water in the Spent Fuel Pool ("SFP") typically contains boron (e.g., 2100-2700 ppm boron) and contact of the cooling water with the RCCAs can cause corrosion of the control rods and pollution of the fluid systems. The frequency and the amplitude of the movements of certain control rods, particularly, when the reactor is used in the load follow mode, are such that it may be necessary to systematically replace a certain number of RCCAs on each core reloading.

It is known in the art to deposit a protective coating on the outer surface of such tubular elements subject to friction to reduce the wear thereof. For example, electrolytic platings of hard chromium and chemical platings of nickel have been produced on control rods and RCCAs. There have been disadvantages experienced with these platings, such as, electrolytic chromium platings are generally fragile and chemically deposited nickel may contaminate the primary circuit of the reactor. Furthermore, coatings containing chromium carbide to which a nickel-chromium bonding alloy is added have demonstrated poor behavior under irradiation.

It is also known in the art to deposit a protective coating by carbon nitriding the outer surface of a tubular element, such as a control rod tube or guide thimble tube, for a nuclear reactor. Nitridation is carried out ionically. The tubular element is subjected to a plasma created by electrical discharge in a low pressure atmosphere containing nitrogen and hydrogen. Active nitrogen ions are implanted at a sufficiently high temperature to cause in-depth diffusion of the ions. Typically, the durations and temperatures of treatment are such that the processed coating layer does not exceed a maximum depth or thickness. In practice, the nitridation process has been conducted at a temperature of from about 500° C. to 550° C. for a period of varying hours. Further, in practice, it has been observed that nitridation, in accordance with these known temperatures, can result in the formation of chromium-nitride and depletion of chromium from the surface of the coating. As a result, the tubular elements can exhibit poor corrosion resistance in the reactor and spent fuel pool environments.

It is desired to develop an improved system and process for the nitridation of tubular elements, such as control rods and RCCAs, to avoid chromium nitride formation while achieving a treated surface having a maximum thickness which is effective in resisting frictional wear and/or corrosion.

SUMMARY OF THE INVENTION

These needs and others are satisfied by the present invention, which is directed to an improved method of treating an outer surface of a tubular element, such as a control rod or a rod control cluster assembly ("RCCA"), for use in a nuclear reactor to improve its wear resistance and/or corrosion resistance.

An aspect of the present invention provides a method of treating an outer surface of a tubular element to form a treatment layer for a water-cooled nuclear reactor. The method includes the steps of providing the tubular element to be treated, the tubular element constructed of a material selected from the group consisting of stainless steel and stainless steel-containing materials; maintaining the tubular element in an atmosphere under pressure, the atmosphere containing gas selected from the group consisting of nitrogen, hydrogen and mixtures thereof; providing an electric discharge in the atmosphere for generating nitrogen ions; and nitriding at least a portion of the outer surface of the tubular element such that nitrogen ions are implanted within at least a portion of the outer surface of the tubular element to a depth of from about 5 to about 25 µm, the nitriding carried out at a temperature of from about 400° C. to about 440° C. In one embodiment, the nitriding is carried out for a duration of from about 12 to about 40 hours.

Another aspect of the present invention provides a system for treating an outer surface of a tubular element for a water-cooled nuclear reactor. The system includes a sealed enclosure having an atmosphere which contains gas selected from the group consisting of nitrogen and hydrogen, and mixtures thereof. The sealed enclosure includes a framework to receive the tubular element and a generator to create an electric discharge to generate active nitrogen ions. The nitrogen ions are implanted by ionic bombardment on at least a portion of the outer surface of the tubular element to form a treatment layer. The sealed enclosure is maintained at a temperature of from about 400° C. to about 440° C. The treatment layer has a depth of from about 5 to about 25 µm. In one embodiment, the tubular element is subjected to ionic bombardment for a duration of from about 12 hours to about 40 hours.

Yet another aspect of the present invention provides a method of treating an outer surface of a tubular element to improve wear resistance and corrosion resistance in a water-cooled nuclear reactor, including the steps of cleaning said tubular element; providing the tubular element in a sealed enclosure; and nitriding the tubular element in the sealed enclosure in an atmosphere which contains gas selected from the group consisting of nitrogen, hydrogen, and mixtures thereof, at a temperature of from about 400° C. to about 440° C. to form a treatment layer on at least a portion of the outer surface of the tubular element, the treatment layer having a depth of from about 5 to about 25 μm, wherein the treatment layer comprises nitrogen ions implanted into at least a portion of the outer surface of the tubular element. In one embodiment, the nitriding is carried out for a duration of from about 12 hours to about 40 hours.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
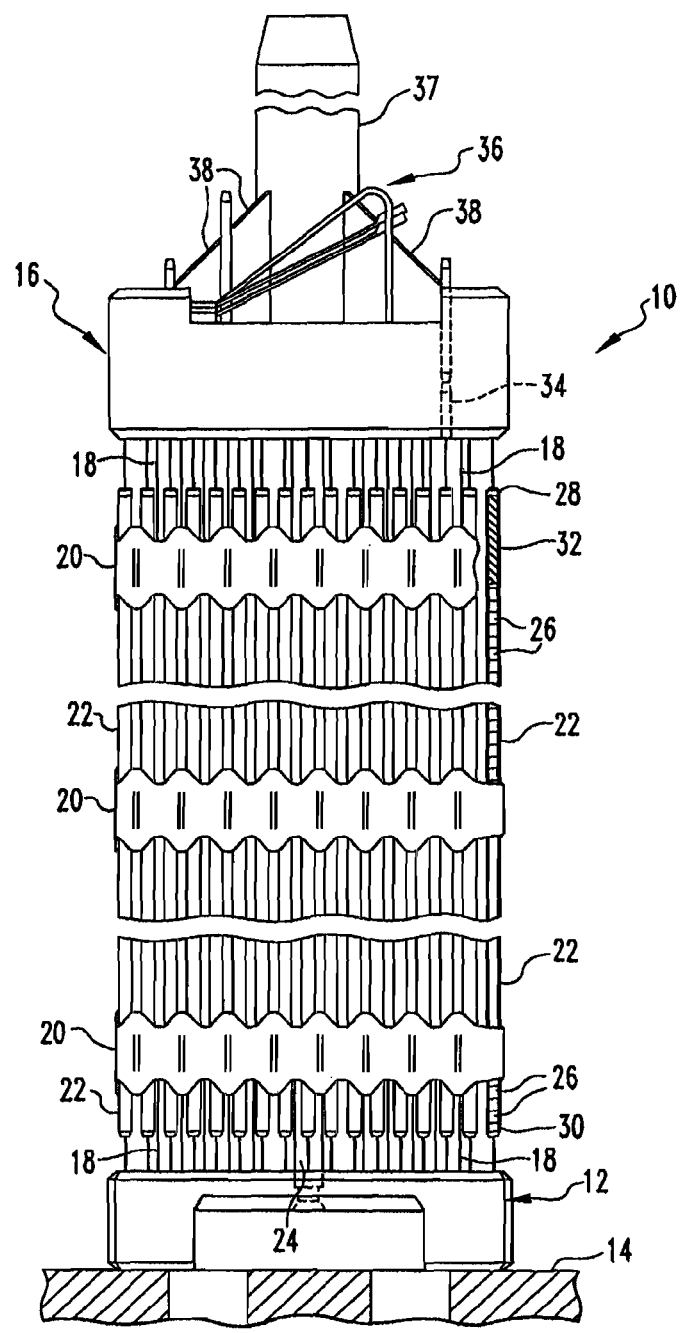
FIG. 1 is an elevational view of a fuel assembly, illustrated in vertically shortened form, and a control rod assembly therefor, partially shown in hidden line drawing.

The present invention relates to a system and method for treating tubular elements, such as control rods and rod control cluster assemblies ("RCCAs"), for use in a nuclear reactor. The treatment includes implanting nitrogen ions into or onto at least a portion of an outer surface of the tubular element. The treatment is carried out in a gas-containing atmosphere at a temperature of from about 400° C. to about 440° C. The depth of the treatment layer, e.g., implantation of nitrogen ions, on the outer surface of the tubular element is from about 5 to about 25 μm. The present invention is applicable to a variety of tubular elements and various nuclear reactor designs. For simplicity of disclosure, the invention will be described with reference to control rods and RCCAs and the pressurized water reactor ("PWR") core design which is commercially known under the designation AP1000. The AP1000 is a Westinghouse Electric Company LLC reactor design. Westinghouse Electric Company LLC has a place of business in Monroeville, Pa. Reference to the AP1000 is provided for illustrative example purposes only and is not limiting upon the scope of the invention. It will, therefore, be appreciated that the method of the invention has application in a wide variety of other reactor designs.

Directional phrases used herein, such as, for example, upper, lower, top, bottom, left, right, and derivatives thereof, relate to the orientation of the elements shown in the drawings and are not limiting upon the claims unless expressly recited therein.

As employed herein, the term "number" shall refer to one and more than one (i.e., a plurality).

FIG. 1 shows an elevational view of a nuclear reactor fuel assembly 10 and a rod control cluster assembly ("RCCA") 36, represented in vertically shortened form. The fuel assembly 10 is the type used in a PWR and has a structural skeleton which, at its lower end, includes a bottom nozzle 12 for supporting the fuel assembly 10 on a lower core support plate 14 in the core region of the nuclear reactor (not shown), a top nozzle 16 at its upper end, and a number of guide tubes or thimbles 18 which extend longitudinally between and are rigidly attached at opposite ends, to the bottom and top nozzles 12 and 16.

The fuel assembly 10 further includes a plurality of transverse grids 20 axially-spaced along and mounted to the guide thimble tubes 18 and, an organized array of elongated fuel rods 22 transversely-spaced and supported by the grids 20. The fuel assembly 10 also has an instrumentation tube 24 located in the center thereof and extending between and mounted to the bottom and top nozzles 12 and 16.

Each of the fuel rods 22 includes nuclear fuel pellets 26 and is closed at its opposite ends by upper and lower end plugs 28 and 30. The pellets 26 are maintained in a stack by a plenum spring 32 disposed between the upper end plug 28 and the top of the pellet stack. The fuel pellets 26, composed of fissile material, are responsible for creating the reactive power of the reactor. A liquid coolant such as water or water containing boron, is pumped upwardly through a plurality of flow openings in the lower core plate 14 to the fuel assembly. The bottom nozzle 12 of the fuel assembly 10 passes the coolant upwardly through the guide thimble tubes 18 and along the fuel rods 22 of the assembly in order to extract heat generated therein. To control the fission process, a number of control rods 34 are reciprocally moveable in the guide thimble tubes 18 located at predetermined positions in the fuel assembly 10.

The RCCA 36 includes an internally-threaded cylindrical member 37 with a plurality of radially-extending flukes or arms 38.

Figure 2B:
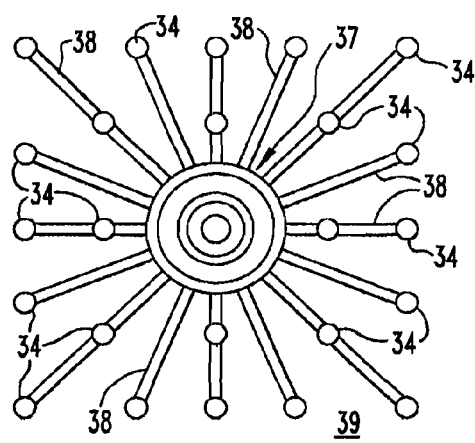
FIG. 2B is a top plan view of the control rod spider assembly for the control rod assembly of FIG. 2A.
Figure 2A:
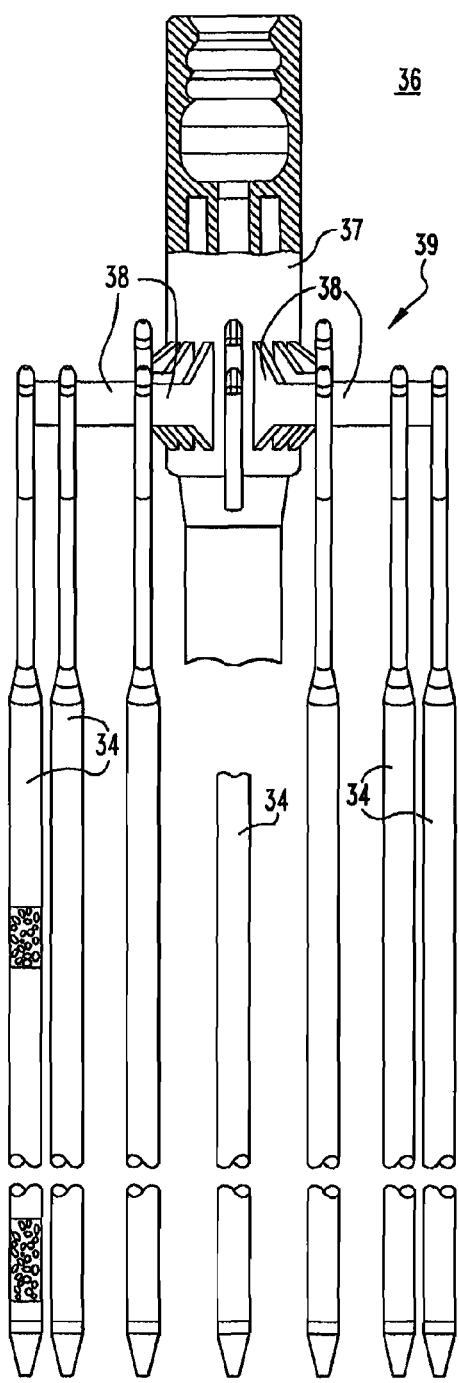
FIG. 2A is a partially sectioned elevational view of the control rod assembly of FIG. 1, which has been removed from the fuel assembly.

FIG. 2A shows the RCCA 36 (shown in FIG. 1) after it has been removed from the fuel assembly 10 (shown in FIG. 1). FIG. 2A also includes the control rods 34, the internally-threaded cylindrical member 37 and the radially-extending flukes or arms 38, as shown in FIG. 1. FIG. 2A further includes a spider assembly 39. The spider assembly 39 is positioned above the top nozzle 16 (shown in FIG. 1) and supports the control rods 34. FIG. 2B shown in detail the spider assembly 39 for the RCCA 36 of FIG. 2A. The control rods 34, the internally-threaded cylindrical member 37 and the radially-extending flukes or arms 38, are included the spider assembly 39. As previously discussed, each of the arms 38 is interconnected to the control rods 34 such that the RCCA 36 (shown in FIGS. 1 and 2A) is operable to move the control rods 34 vertically within the guide thimble tubes 18 (shown in FIG. 1) to thereby control the fission process in the fuel assembly 10 (shown in FIG. 1).

Each of the fuel rods 22, control rods 34, and guide thimble tubes 18 can be made of stainless-steel and various stainless steel-containing materials including, but not limited to, chromium-nickel stainless steel, such as, for example, ANSI 304 steel, the principal components of which are as follows: Ni: 8.50 to 11% wt; Cr: 17 to 19% wt; carbon: 8% wt maximum; and Mn: 2% wt maximum. The remainder is iron with the exception of minimal unavoidable impurities.

In accordance with the present invention, to reduce wear of the control rods 34 when they frictionally slide on the guide thimble tubes 18, the outer surface of each of the control rods 34 undergoes a treatment process. The treatment includes nitriding the outer surface of each of the control rods 34 such that nitrogen ions are deposited and/or implanted as a result of ionic bombardment onto and/or into the outer surface of each of the control rods 34. The thickness or depth of the treatment layer or treated surface, e.g., nitrogen ions, can vary. In the present invention, the depth of the treatment layer is from about 5 to about 25 μm or from about 5 to about 22 μm or from about 5 to about 20 μm or from about 8 to about 15 μm or from about 10 to about 12 μm. Furthermore, the nitridation can be carried out at various temperatures. In the present invention, the nitridation, i.e., implantation of nitrogen ions into/onto the outer surface of the tubular elements, is conducted at a temperature of from about 400° C. to about 440° C. Without intending to be bound by any particular theory, it is believed that a tubular element which is nitrided at a temperature within the specified range and/or at a depth within the specified range demonstrates improved corrosion resistance and wear resistance as compared to a tubular element which is nitrided at a temperature outside of the specified range and/or a depth outside of the specified range.

In general, the nitridation process includes the generation of active nitrogen ions, the bombardment of these nitrogen ions and their implantation onto or into the outer surface of a tubular element to form a surface treatment. As a result, the treated surface is effective to protect against corrosion and wear, for example, when the tubular element, such as control rods 34 or RCCAs 36, is subjected to high-temperature and high-pressure water in a nuclear reactor core.

The nitridation process is typically conducted under vacuum conditions in the presence of nitrogen and/or hydrogen.

Figure 3:
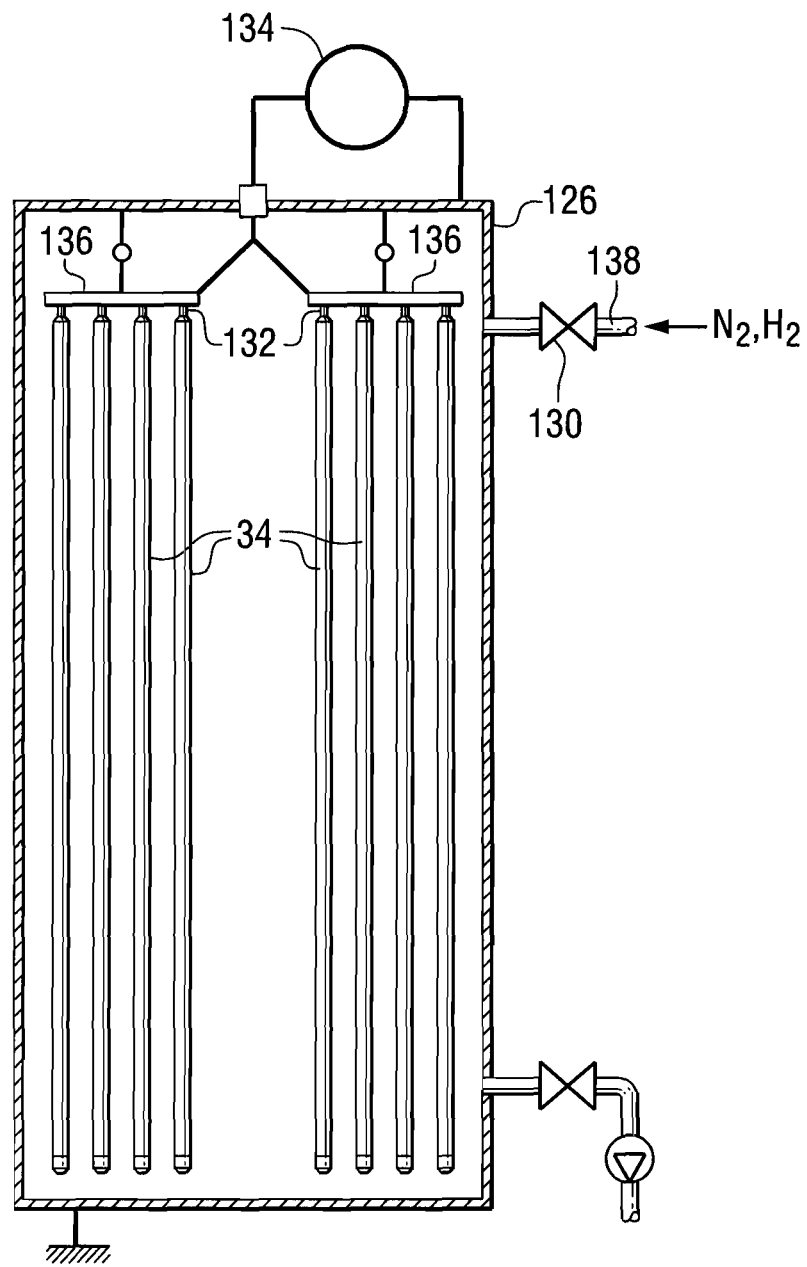
FIG. 3 is a diagram showing an apparatus for treating a tubular element in accordance with an embodiment of the invention.

The nitridation process can be conducted using conventional techniques and apparatuses known in the art. In one embodiment, nitridation of a tubular element, e.g., control rods 34 or RCCAs 36, may be carried out in a device as shown diagrammatically in FIG. 3. The device of FIG. 3 includes a sealed enclosure 126. The sealed enclosure 126 can be constructed in accordance with various apparatuses and devices known in the art for conducting a nitridation operation. The sealed enclosure 126 in FIG. 3 includes a vacuum pump (not shown). The vacuum pump (not shown) is operable to reduce the pressure in the sealed enclosure 126. The pressure in the sealed enclosure 126 can vary. In one embodiment, the vacuum pump (not shown) operates to reduce the pressure to within a range of from about 30 to 200 Pascals. Further, the sealed enclosure 126 is provided with an inlet pipe 138 with a check valve 130 for introducing and controlling gas into the enclosure. The gas can be selected from those known in the art for use in nitridation operations. The gas can include nitrogen, hydrogen, and mixtures thereof. In one embodiment, the gas is nitrogen or hydrogen. In another embodiment, the gas is a mixture of nitrogen and hydrogen. The enclosure 126 also includes a generator 134 to create an electric discharge, e.g., a voltage, therein. The enclosure 126 contains a framework 136 for receiving one or more tubular elements, e.g., control rods 34, to be processed. The control rods 34 include temporary upper plugs 132.

A typical sequence for the nitridation operation is described as follows. For simplicity of disclosure, the operation will be described with reference to the control rods 34. Reference to control rod 34 is provided for illustrative example purposes only and is not limiting upon the scope of the invention. It will, therefore, be appreciated that the operation as described is equally applicable to a variety of other tubular elements.

Each of the control rods 34, to be processed, is cleaned and a temporary upper plug 132 is fixed on a top end of each of the control rods 34. The plug 132 is used for holding each of the control rods 34 during coating. Each of the control rods 34 is placed in the enclosure 126 and the portions close to the upper plug 132 are masked to avoid nitriding the surface of the control rods 34 in these zones. The enclosure 126 is scavenged and an atmosphere of nitrogen and hydrogen under a low pressure is created. The total pressure is from about 100 to about 150 Pa, preferably from about 130 to about 140 Pa, and most preferably about 133 Pa. The nitrogen partial pressure may be in the range of from about 40 to about 60 Pa. A voltage which is typically in the range of from about 400 V to about 700 V, depending on the load, is created by the generator 134 across the enclosure 126 and the control rods 34 to be treated. Active nitrogen ions are formed as a result of dissociation of the gaseous mixture by the electrical discharge. The nitrogen ions are implanted by ionic bombardment onto and/or into the outer surface of the control rods 34 to form a treated surface. The nitridation treatment of the control rods 34 is carried out at a temperature within the range of from about 400° C. to about 440° C. A conventional means (not shown) is employed to maintain the temperature within this range of from about 400° C. to about 440° C. in the enclosure 126. The nitridation operation is continued until the depth of the implantation, e.g., treatment, reaches the desired value as described above.

The duration of treatment can adversely affect the corrosion resistance of the control rods 34 being processed. Thus, the duration of treatment is such that the formation of chromium nitride is minimized or precluded while a maximum depth or thickness of the coating layer is achieved. In an embodiment, the duration of nitridation treatment is about 12 hours or greater, or preferably from about 12 to about 40 hours, or more preferably from about 20 to about 40 hours. The duration of the nitridation operation can depend on the chemical composition of the tubular element that is being processed, e.g., different types of stainless steel and stainless steel-containing materials may result in a different treatment duration.

In one embodiment, following the nitridation operation, the surface treated control rods 34 can be optionally subjected to an oxidation treatment. In this embodiment, the enclosure 126 is scavenged and filled with an oxidizing atmosphere under a pressure of about the same value as during the nitridation operation. A plasma, which contains active oxygen ions, is generated for limited oxidation of the surface treatment, e.g., implanted nitrogen ions. This step may be carried out at a temperature of from about 400° C. to about 440° C., for a period sufficient for obtaining an appropriate passivation. Typically, the duration will be higher than one hour and lower than that time which would result in passivating of the metal over a depth higher than that attained by the nitrogen ions.

Following the nitration operation, or optionally, the oxidation operation, the control rods 34 are removed from the enclosure 126. The temporary upper plug 132 is removed. The control rods 34 are loaded with absorbent material and the final upper end plug (not shown) is placed in each of the control rods 34.

In another embodiment, the control rods 34 are loaded with neutron absorbing material and closed prior to subjecting the control rods 34 to the nitridation operation as described above.

The resulting surface treatment on the tubular element has a hardness that can vary. The hardness can be measured using a variety of apparatuses and methods known in the art (for example, ASTM E-384). In an embodiment, the hardness of the surface treatment is measured using a Knoop Hardness Tester at half case depth with 25 gram load. In this embodiment, the surface treatment has a micro-hardness of from about 1150 to about 1650 KHN and preferably from about 1169 to about 1610 KHN.

The present invention is applicable to tubular elements for use in nuclear reactors other than control rods and RCCAs. It can particularly be used for clusters of rods having another function and whose surfaces must withstand frictional or vibration wear. It is further possible to subject the internal surface of tubes subject to friction of a part which slides therein, to a similar treatment.

EXAMPLES

Example 1

Wear Test to Compare Nitrided and Chrome Plated Tubes

A wear test apparatus was mounted vertically in an autoclave. The conditions and chemistry in the autoclave were representative of an operating PWR. Two specimens, i.e., a tube and a wear block, were mated to represent a typical PWR wear pair. The tubes were constructed of either ion nitride samples or chrome-plated samples. The wear blocks were constructed of either 304 stainless steel or Zirlo. The wear blocks constructed of 304 stainless steel represented the guide card surface. The Zirlo wear blocks represented the thimble tube surface. The test apparatus had several separate test stations. Each station included a wear pair and each station had similar loadings. The following Table 1 shows the results of the wear tests. In summary, the 304 stainless steel and the Zirlo wear plates rubbed by chrome-plated tubes showed significantly more wear than plates rubbed by ion nitrided tubes. Furthermore, the chrome-plated tubes had significantly more wear than the ion nitride tubes.

TABLE 1

Comparison of Mean Weight Loss ($\times 10^{-5}$ μgrams)

| | | Corrected | | | | Uncorrected (Raw) | | | |
| --- | --- | --- | --- | --- | --- | --- | --- | --- | --- |
| | | Tube | | Wear Plate | | Tube | | Wear Plate | |
| Test No. | Load (lb.) | Chrome | Ion Nitride | Chrome | Ion Nitride | Chrome | Ion Nitride | Chrome | Ion Nitride |
| 9 | 4 | −14 | 321 | 27148 | 14197 | −7 | 255 | 27060 | 14109 |
| 6 | 4 | 99 | −30 | 312 | 81 | 95 | −88 | 301 | 70 |
| 8 | 2 | 40 | −20 | 75 | 15 | 23 | −99 | 77 | 17 |
| 5 | 2 | 9 | −31 | N/A | N/A | 6 | −127 | 78 | 27 |
| 7 | 2 | −62 | −27 | 26 | 13 | 9 | −101 | 26 | 13 |

Example 2

Corrosion Test in Simulated Spent Fuel Pool

A bath of borated water, exposed to air, having a boron concentration of from 2100 to 2700 ppm and a pH in the range of 4 to 6, was heated to a temperature of 125° F. at ambient pressure for a duration of 14 days. Tube samples were placed in reaction cattles filled with the borated water and immersed in a controlled hot water bath. Four ion nitrided tubes and one chrome-plated tube were tested. One ion nitrided tube was processed at a conventional nitride temperature in the range of from 500° C. to 550° C. and the three other ion nitrided tubes were nitrided at a temperature in the range of from 400° C. to 440° C., in accordance with the present invention. The test results demonstrated the presence of corrosion was observed by visual inspection on the tube that was nitrided at a conventional temperature range on the first day. The tubes that were nitrided at a temperature within the range of the present invention and the tube that was chrome-plated remained clear. The results also showed that the corrosion rate decreased as the exposure time was increased.

Example 3

Microhardness Measurements

Metallographic cross sections were made from several stainless steel tubes that were ion nitrided in accordance with the present invention to determine the depth and hardness of the treatment layer, and also to determine whether the hardness varied within the treatment layer. The analyses were performed on transverse cross sections of the treatment layer. The tubes were examined using optical microscopy and on an automated, closed-loop Instron microhardness tester. The microhardness tester was equipped with a Knoop hardness indenter that made pyramid-shaped indents into the treated surface of the tubes to be tested. The force was maintained at a light indentation of 25-50 grams because the thickness of the hardened treatment layer was small. The microhardness readings were related to the size of the indent. In general, the higher the hardness reading, the smaller the indent. In order to obtain information on how microhardness changed with depth into the treated surface of the tube, an array of hardness indents was made so that measurements could be taken at fine depth increments. Each indent remained sufficiently apart so as to maintain valid readings. On the optical micrographs, the hardened layer was visible and appeared to be slightly darker than the tube matrix. Measurements of the depth of the hardened treatment layer were taken at a number of locations. The measurements included the top, middle, and bottom of the tube surface to determine how uniform was the hardened treatment layer based on depth. The results are shown in Table 2.

TABLE 2

Hardened Layer Thickness "X" (μm)

| Vendor | Average "X" | "X" Top | "X" Middle | "X" Bottom |
| --- | --- | --- | --- | --- |
| Current Low Temperature Process | 8 | 10 | 8 | 6 |
| Current Low Temperature Process | 17 | 11 | 18 | 22 |
| Current Low Temperature Process | 24 | N/A | N/A | N/A |
| Conventional Nitride Process | 58 | N/A | N/A | N/A |
| Conventional Nitride Process | 56 | N/A | N/A | N/A |
| Conventional Nitride Process | 37 | N/A | N/A | N/A |

As demonstrated in Table 2, the average depth of the hardened treatment layer, in accordance with the process of the present invention (i.e., having a nitriding temperature within the range of 400° C. to 440° C., "Low Temperature Process"), was in the range of from 8 μm to 24 μm. The average depth of the hardened treatment layer in the Conventional Nitride Process (i.e., having a nitriding temperature within the range of 500° C. to 550° C.) was thicker such that the depth was in the range of from 37 μm to 58 μm. In each case, the hardness decreased significantly when the end of the treatment layer was reached.

Whereas particular embodiments of the invention have been described herein for purposes of illustration, it will be evident to those skilled in the art that numerous variations of the details may be made without departing from the invention as set forth in the appended claims.

I claim:

1. A method of treating an outer surface of a tubular element to form a treatment layer for a water-cooled nuclear reactor, comprising the steps of:
   providing said tubular element to be treated, said tabular element constructed of a material selected from the group consisting of stainless steel and stainless steel-containing materials;
   maintaining said tubular element in an atmosphere under pressure, said atmosphere containing gas selected from the group consisting of nitrogen, hydrogen and mixtures thereof;
   providing an electric discharge in said atmosphere for generating nitrogen ions; nitriding at least a portion of the outer surface of said tubular element to a depth of from about 5 to about 25 μm, said nitriding carried out at a temperature of from about 400° C. to about 440° C.

2. The method of claim 1, wherein said water-cooled nuclear reactor is a pressurized water nuclear reactor.

3. The method of claim 1, wherein said nitriding is carried out for a duration of from about 12 to about 40 hours.

4. The method of claim 3, wherein said tubular element is selected from the group consisting of a control rod, a rod control cluster assembly, and a guide thimble tube.

5. The method of claim 1, wherein said tubular element is a tube in the spent fuel pool of said water-cooled nuclear reactor.

6. The method of claim 1, wherein said gas is a mixture of nitrogen and hydrogen.

7. The method of claim 1, wherein the composition of said stainless steel-containing materials comprise stainless steel, nickel and chromium.

8. The method of claim 1, wherein said depth is from about 5 μm to about 20 μm.

9. The method of claim 1, wherein said pressure of said atmosphere is from about 30 to about 150 Pascals.

10. The method of claim 1, further comprising the steps of:
    maintaining in an atmosphere under pressure said tubular element having a nitrided layer deposited on said outer surface; and
    providing a plasma in said atmosphere, said plasma containing active oxygen ions for oxidizing at least a portion of said nitrided layer.

11. The method of claim 1, wherein said treatment layer has a micro-hardness of from about 1150 to about 1650 KHN.

12. The method of claim 1, wherein said treatment layer has a micro-hardness of from about 1169 to 1610 KHN.

13. The method of claim 1, wherein said depth is from about 8 μm to about 15 μm.

14. A system for treating an outer surface of a tubular element for a water-cooled nuclear reactor, comprising a sealed enclosure having an atmosphere which contains gas selected from the group consisting of nitrogen, hydrogen, and mixtures thereof, said sealed enclosure comprising a framework to receive said tubular element and a generator to create an electric discharge to generate active nitrogen ions which are implanted by ionic bombardment on at least a portion of the outer surface of the tubular element to form a treatment layer, wherein said sealed enclosure is maintained at a temperature of from about 400° C. to about 440° C. and said treatment layer has a depth of from about 5 to about 25 μm.

15. The system of claim 14, wherein the tubular element is subjected to ionic bombardment of the active nitrogen ions for a duration of from about 12 to about 40 hours.

16. A method of treating an outer surface of a tubular element to improve wear resistance and corrosion resistance in a water-cooled nuclear reactor, comprising the steps of:
    cleaning said tubular element;
    providing said tubular element in a sealed enclosure; and
    nitriding said tubular element in said sealed enclosure in an atmosphere containing gas selected from the group consisting of nitrogen, hydrogen, and mixtures thereof, at a temperature of from about 400° C. to about 440° C. to form a treatment layer on at least a portion of the outer surface of said tubular element, said treatment layer having a depth of from about 5 to about 25 μm, wherein the treatment layer comprises nitrogen ions implanted into at least a portion of the outer surface of the tubular element.

17. The method of claim 16, further comprising oxidizing at least a portion of the coating formed by said nitriding, comprising the steps of scavenging said enclosure, generating a plasma containing active oxygen ions; and contacting said tubular element with said oxygen ions for at least partial oxidation of said coating formed by said nitriding.

18. The method of claim 16, wherein said nitriding is carried out for a duration of from about 12 to about 40 hours.

* * * * *